United States Patent
Shimai et al.

(10) Patent No.: US 12,260,276 B2
(45) Date of Patent: Mar. 25, 2025

(54) IC TAG AND MANUFACTURING METHOD

(71) Applicant: NITTA CORPORATION, Osaka (JP)

(72) Inventors: Toshiharu Shimai, Yamatokooriyama (JP); Hayato Tomita, Yamatokooriyama (JP); Yoshihiro Miyagi, Yamatokooriyama (JP)

(73) Assignee: NITTA CORPORATION, Osaka (JP)

( * ) Notice: Subject to any disclaimer, the term of this patent is extended or adjusted under 35 U.S.C. 154(b) by 0 days.

(21) Appl. No.: 18/010,184

(22) PCT Filed: Apr. 28, 2021

(86) PCT No.: PCT/JP2021/017119
§ 371 (c)(1),
(2) Date: Jan. 5, 2023

(87) PCT Pub. No.: WO2021/221141
PCT Pub. Date: Nov. 4, 2021

(65) Prior Publication Data
US 2023/0237302 A1    Jul. 27, 2023

(30) Foreign Application Priority Data

Apr. 30, 2020  (JP) ................................ 2020-080052
Jun. 30, 2020  (JP) ................................ 2020-113657

(51) Int. Cl.
*G06K 19/077* (2006.01)
(52) U.S. Cl.
CPC . *G06K 19/07728* (2013.01); *G06K 19/07758* (2013.01)

(58) Field of Classification Search
CPC ........ G06K 19/07728; G06K 19/07758; B32B 27/08; B32B 2307/732; B32B 3/08;
(Continued)

(56) References Cited

U.S. PATENT DOCUMENTS

2010/0097191 A1    4/2010  Yamagajo et al.
2019/0286964 A1    9/2019  Shimai et al.

FOREIGN PATENT DOCUMENTS

CN    102737271 A    10/2012
EP    1 744 268 A2    1/2007
(Continued)

OTHER PUBLICATIONS

Y. P. Zhang, M. Sun, K. M. Chua, L. L. Wai and D. Liu, "Antenna-in-Package Design for Wirebond Interconnection to Highly Integrated 60-GHz Radios," in IEEE Transactions on Antennas and Propagation, vol. 57, No. 10, pp. 2842-2852, Oct. 2009, doi: 10.1109/TAP.2009.2029290. (Year: 2009).*
(Continued)

*Primary Examiner* — Matthew Mikels
(74) *Attorney, Agent, or Firm* — Birch, Stewart, Kolasch & Birch, LLP (57) ABSTRACT

An IC tag according to the present invention includes: a base sheet having a first surface and a second surface; an IC chip arranged on the first surface of the base sheet; an antenna that is arranged on the first surface of the base sheet and is configured to electrically transmit and receive information stored in the IC chip; and a protective sheet that is fixed to the first surface of the base sheet via a bonding agent, so as to cover the IC chip and the antenna. The protection sheet has a protruding portion that protrudes along the IC chip.

9 Claims, 5 Drawing Sheets

(58) Field of Classification Search
CPC ......... B32B 7/12; B32B 27/308; B32B 27/36; B32B 27/38; B32B 2250/24
See application file for complete search history.

(56) References Cited

FOREIGN PATENT DOCUMENTS

| | | |
|---|---|---|
| JP | 2000-6562 A | 1/2000 |
| JP | 2007-128269 A | 5/2007 |
| JP | 2010-128934 A | 6/2010 |
| JP | 2012-73969 A | 4/2012 |
| JP | 2013-222409 A | 10/2013 |
| JP | 2017-16350 A | 1/2017 |
| WO | WO 2009/011041 A1 | 1/2009 |

OTHER PUBLICATIONS

International Search Report for PCT/JP2021/017119 (PCT/ISA/210) mailed on Jun. 29, 2021.
Written Opinion of the International Searching Authority for PCT/JP2021/017119 (PCT/ISA/237) mailed on Jun. 29, 2021.
Extended European Search Report for European Application No. 21795309.0, dated Jun. 10, 2024.
Taiwanese Office Action and Search Report for Taiwanese Application No. 109146452, dated Apr. 11, 2024, with an English translation.
Japanese Office Action for Japanese Application No. 2020-113657, dated Jul. 30, 2024, with an English translation.
Japanese Office Action for Japanese Application No. 2020-113657, dated Jan. 16, 2024, with English translation.

* cited by examiner

IC TAG AND MANUFACTURING METHOD

TECHNICAL FIELD

The present invention relates to an IC tag and a manufacturing method for the same.

BACKGROUND ART

In recent years, an IC tag called an inlet, which has a configuration in which an antenna for radio wave communication and an IC chip are mounted on a base sheet made of plastic or paper, has been proposed as a type of IC tag. Such an inlet is sealed with resin, is attached to an article or embedded in an article, and is used for article management.

CITATION LIST

Patent Literature

Patent Literature 1: WO 2009/011041

SUMMARY OF INVENTION

Technical Problem

Incidentally, the IC tag as described above is sometimes used in a severe environment where an external force such as bending is received, and there is a risk that the IC chip will separate from the antenna. When the IC chip separates from the antenna in this manner, communication may become impossible.

The present invention has been made in order to solve the above-described problem, and aims to provide an IC tag and a manufacturing method for the same, according to which it is possible to prevent the IC chip from separating even when an external force such as bending acts on the tag.

Solution to Problem

An IC tag according to the present invention includes: a base sheet having a first surface and a second surface; an IC chip arranged on the first surface of the base sheet; an antenna that is arranged on the first surface of the base sheet and is configured to electrically transmit and receive information stored in the IC chip; and a protective sheet that is fixed to the first surface of the base sheet via a bonding agent, so as to cover the IC chip and the antenna, in which the protective sheet has a protruding portion that protrudes along the IC chip.

The above IC tag can be configured such that the IC chip is closest to the protective sheet at an edge portion of a surface of the IC chip on the protective sheet side.

In the above IC tag, the bonding agent can be made of a thermosetting resin.

In the above IC tag, the protective sheet can be made of a resin material with a thickness of 25 to 250 μm.

A manufacturing method for an IC tag according to the present invention includes: fixing an IC chip and an antenna configured to electrically transmit and receive information stored in the IC chip to a first surface of a base sheet having the first surface and a second surface; arranging a protective sheet on the first surface of the base sheet via a bonding agent, so as to cover the IC chip and the antenna; arranging an elastically-deformable support sheet on the protective sheet; and forming a protruding portion that protrudes along the IC chip on the protective sheet by pressing the protective sheet while heating, via the support sheet.

In the above manufacturing method for an IC tag, a vacuum press can be used in the pressing of the protective sheet.

Advantageous Effects of the Invention

According to the IC tag of the present invention, it is possible to prevent the IC chip from separating even when an external force such as bending acts thereon.

DESCRIPTION OF EMBODIMENTS

1. Overview of IC Tag

Figure 1:
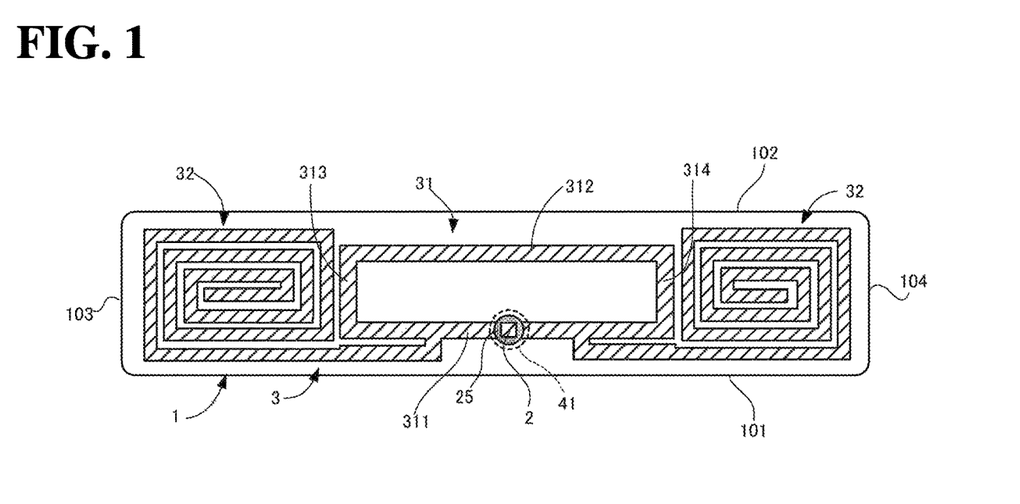
FIG. 1 is a plan view showing an embodiment of an IC tag according to the present invention.
Figure 2:
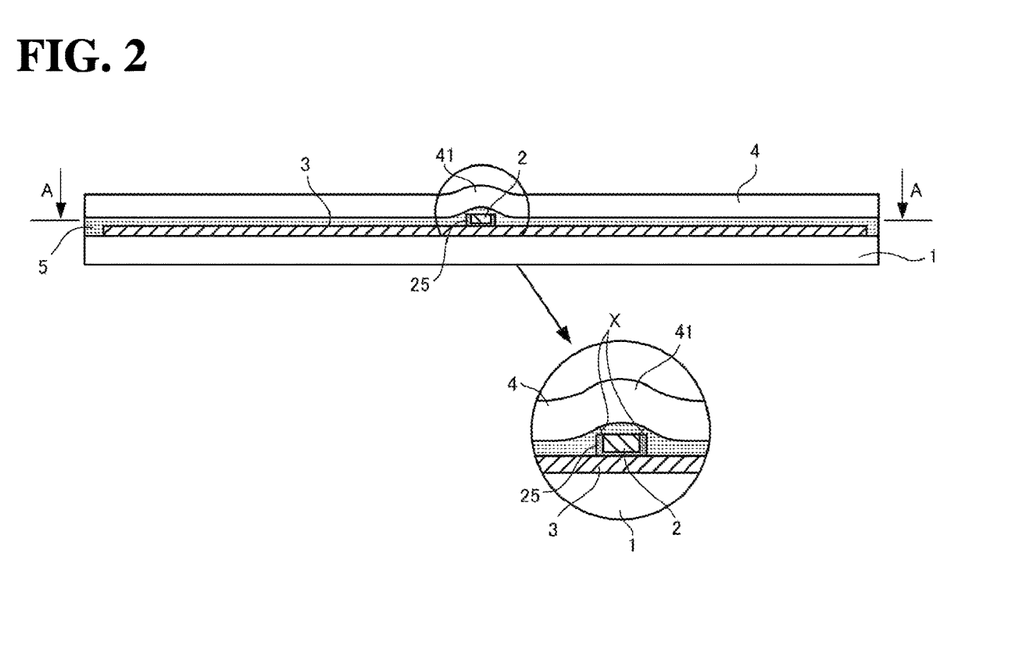
FIG. 2 is a cross-sectional view of the IC tag of FIG. 1.

An embodiment of an IC tag according to the present invention will be described below with reference to the drawings. FIG. 1 is a plan view of the IC tag according to the present embodiment (a cross-sectional view taken along line A-A in FIG. 2), and FIG. 2 is a cross-sectional view of FIG. 1. As shown in FIGS. 1 and 2, the IC tag according to the present embodiment includes: a base sheet 1 formed in a rectangular shape having an upper surface (first surface) and a lower surface (second surface), an IC chip 2 and an antenna 3 that are arranged on the upper surface of the base sheet 1, and a protective sheet 4 that is formed in a rectangular shape and covers the IC chip 2 and the antenna 3. Also, the protective sheet 4 is fixed to the first surface of the base sheet 1 with a bonding agent 5. Each of these members will be described in detail below.

Although there is no particular limitation on the material constituting the base sheet 1, for example, the base sheet 1 can be made of, for example, polyethylene, polypropylene, polyvinyl chloride, polyester resins such as polyethylene terephthalate, polyimide resins, and the like. Also, the thickness of the base sheet 1 is, for example, preferably 25 to 200 μm, and more preferably 50 to 150 μm.

Hereinafter, for convenience of description, as shown in FIG. 1, sides in the longitudinal direction of the base sheet 1 and the protective sheet 4 are called a first side 101 and a second side 102, and sides in a lateral direction are called a third side 103 and a fourth side 104. Accordingly, these sides are connected in the following order: the first side 101, the third side 103, the second side 102, and the fourth side 104.

The IC chip 2 is a known IC chip having a memory function, and is electrically connected to a dipole antenna 3 made of a conductor.

In this embodiment, as an example, a dipole antenna as shown in FIG. 1 is used. That is, the dipole antenna 3 includes an impedance matching portion 31 arranged near the center in the longitudinal direction of the base sheet 1, and a pair of dipole portions 32 extending from the impedance matching portion 31 in the longitudinal direction of the base sheet 1. The impedance matching portion 31 is formed in a rectangular frame shape having first to fourth sides. More specifically, a first side 311 of the impedance matching portion 31 is arranged at a position slightly spaced apart from the first side 101 of the base sheet 1, and a second side 312 is arranged along the second side 102 of the base sheet 1. That is, the first side 311, the third side 313, the second side 312, and the fourth side 314 of the impedance matching portion 31 are connected in this order. The IC chip 2 is arranged near the center of the first side 311 of the impedance matching portion 31.

Since the dipole portion 32 has a bilaterally symmetrical shape, only the left side of FIG. 1 will be described. The dipole portion 32 forms a rectangular frame so as to extend from the first side 311 of the impedance matching portion 31 to the first side 101 of the base sheet 1, extend from there along the first side 101, the third side 103, and the second side 102 of the base sheet 1, and further extend along the third side 313 of the impedance matching section 31, and thereafter extends spirally inside the frame. Note that although there is no particular limitation on the thickness of the dipole antenna 3, for example, the thickness can be set to 5 to 20 μm.

Although there is no particular limitation on the material constituting the dipole antenna 3, for example, the dipole antenna 3 can be made of a conductive material such as silver, copper, or aluminum. When silver is used, the dipole antenna 3 can be formed by applying a silver paste containing silver onto the base sheet 1 through screen printing. On the other hand, when copper or aluminum is used, the dipole antenna 3 can be formed by etching, for example. Also, the IC chip 2 is fixed to the antenna 3 with a conductive bonding agent 25 such as ACP, for example. In addition, the IC chip 2 can be fixed to the antenna 3 through known flip-chip mounting for electronic components. Note that although there is no particular limitation on the thickness of the IC chip 2, the thickness can be 100 to 150 μm.

Information stored in the IC chip 2 can be transmitted and received by the dipole antenna 3 as described above, for example, with use of radio waves in the UHF band.

The protective sheet 4 is preferably made of a heat-deformable material, and can be made of the same material as the base sheet, for example. Also, the thickness of the protective sheet 4 is, for example, preferably 25 to 250 μm, and more preferably 50 to 150 μm.

Also, in the protective sheet 4, a protruding portion 41 protruding along the IC chip 2 is formed at a location where the IC chip 2 is arranged. More specifically, the protruding portion 41 is formed above the IC chip 2 so as to have a roughly arcuate cross section. Also, in a plan view, the protruding portion 41 is formed in a substantially circular shape so as to follow the planar shape of the conductive bonding agent 25. Also, the IC chip 2 and protective sheet 4 are closest to each other near the peripheral edge of the IC chip 2. The distance X of the location where the IC chip 2 and the protective sheet 4 are closest to each other is, for example, preferably 1 to 20 μm, more preferably 1 to 12 μm, and particularly preferably 1 to 8 μm. Also, the lower surface of the protective sheet 4, that is, the surface facing the base sheet 1, is lower than the upper surface of the IC chip 2 in the region outside the protruding portion 41.

The bonding agent 5 can be made of a material containing, for example, an acrylic thermosetting resin, an ester-based thermosetting resin, an epoxy-based thermosetting resin, or a polyimide-based thermosetting resin as a main component. Such a thermosetting bonding agent is suitable for bonding the protective sheet 4 and the base sheet 1 while forming the protruding portion 41 by applying pressure, as will be described later. However, a thermoplastic bonding agent can also be used.

2. Manufacturing Method for IC Tag

Figure 3A:
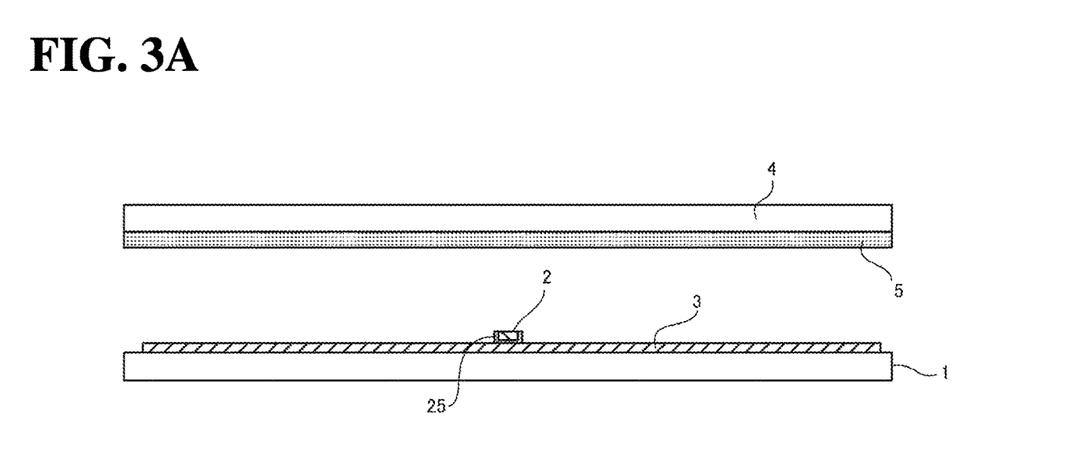
FIG. 3A is a cross-sectional view showing a manufacturing method for the IC tag of FIG. 1.
Figure 3B:
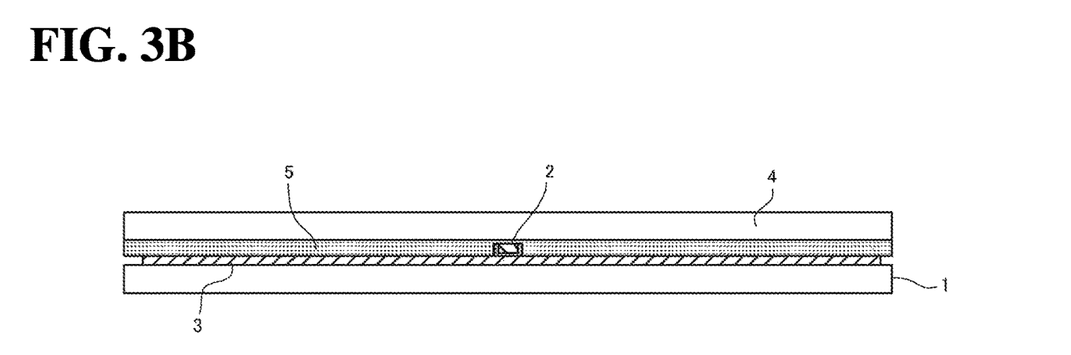
FIG. 3B is a cross-sectional view showing a manufacturing method for the IC tag of FIG. 1.

The IC tag configured as described above can be formed by various methods, and for example, it can be formed by the following method. First, as shown in FIG. 3A, the dipole antenna 3 is formed on the base sheet 1 by an above-described method such as screen printing or etching. Then, the IC chip 2 is fixed on the dipole antenna 3 by the above-described method, for example, the conductive bonding agent 25. Also, a protective sheet 4 having the same size as the base sheet 1 is prepared. The bonding agent 5 described above is applied to the lower surface of the protective sheet 4 in advance. Next, as shown in FIG. 3B, this protective sheet 4 is arranged on the base sheet 1 so as to cover the dipole antenna 3 and the IC chip 2.

Figure 3C:
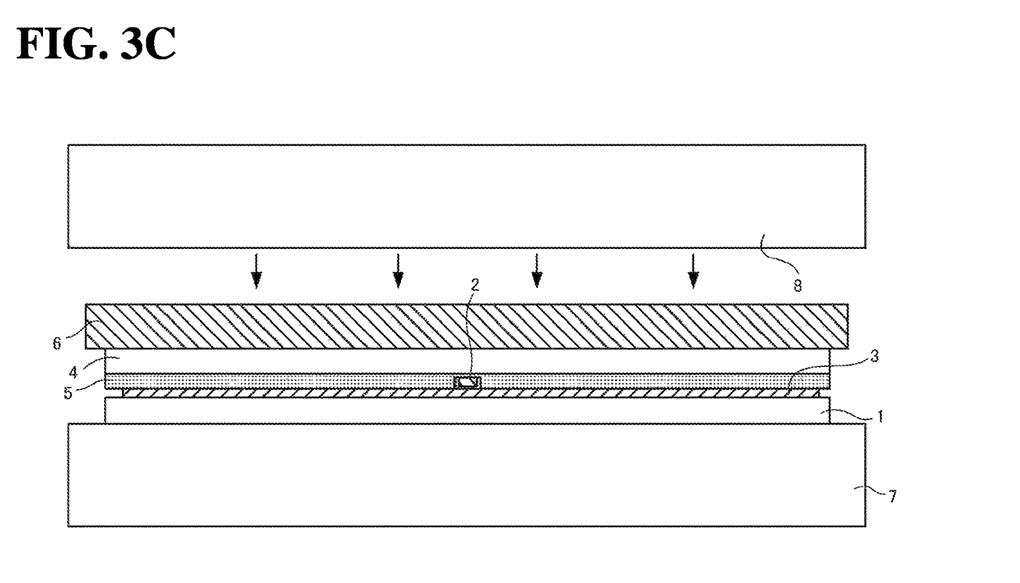
FIG. 3C is a cross-sectional view showing a manufacturing method for the IC tag of FIG. 1.

Subsequently, as shown in FIG. 3C, the base sheet 1 is arranged on the support plate 7, and the support sheet 6 is arranged on the protective sheet 4. This support sheet 6 is an elastically deformable sheet for absorbing deformation of the protective sheet 4 by the IC chip 2, as will be described later, and for example, is preferably a material with a durometer hardness (JIS K7215-1986) of HDD 10 to HDD 90, and more preferably HDD 10 to HDD 70. Specifically, a resin material such as LDPE (low density polyethylene), LLDPE (linear low density polyethylene), HDPE (high density polyethylene), PTFE (polytetrafluoroethylene resin), EMMA (ethylene-methyl methacrylate copolymer resin), or EVA (ethylene-vinyl acetate copolymer resin) can be used. Preferably, the upper and lower surfaces of the support sheet 6 are coated with a mold release agent. In addition, as will be described later, the thickness of the support sheet 6 is preferably a thickness that can absorb at least the protruding portion 41 of the protective sheet 4, and for example, is preferably 50 to 300 μm, and more preferably 100 to 200 μm.

Then, this support sheet 6 is pressed by a heating plate 8. The temperature, time, and pressure of the pressing by the heating plate 8 can be set in various ways, but the setting needs to be performed such that the IC chip 2 is not damaged by the pressing and the protruding portion 41 is formed on the protective sheet 4 along the IC chip 2. For example, the temperature is raised from 40° C. to 160° C. in about 5 to 30 minutes (more preferably 10 to 20 minutes), and pressing is continued at 160° C. for 15 to 50 minutes (more preferably 20 to 40 minutes). Thereafter, the temperature is lowered from 160° C. to 40° C. in about 5 to 30 minutes (more preferably 10 to 20 minutes). During this time, the heating plate 8 presses the support sheet 6 with a pressure of 1 to 6 MPa, and more preferably 3 to 4 MPa. Note that although the temperature of the heating plate 8 depends on the materials of the protective sheet 4 and the support sheet 6, other temperatures may be used. However, the temperature is preferably a temperature at which the protective sheet 4 and the support sheet 6 are deformed, and for example, the starting temperature is preferably 20 to 100° C., and the maximum temperature is preferably 120 to 180° C.

Figure 3D:
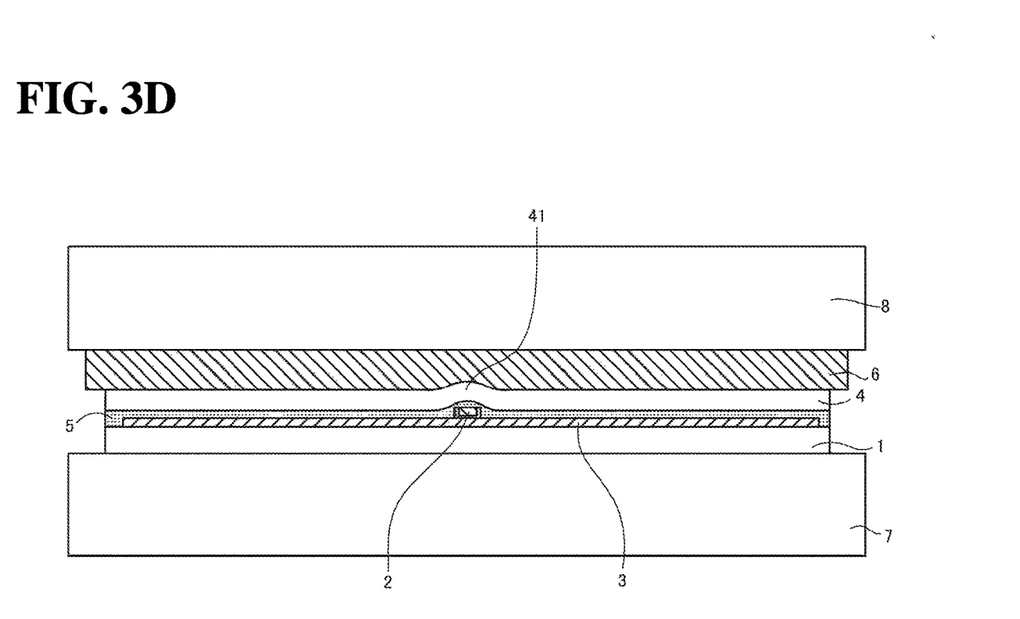
FIG. 3D is a cross-sectional view showing a manufacturing method for the IC tag of FIG. 1.

Also, as shown in FIG. 3D, when the support sheet 6 is pressed by the heating plate 8, the protective sheet 4 is pressed and the bonding agent 5 is also pressed. In this process, the location of the protective sheet 4 corresponding to the IC chip 2 is pressed by the IC chip 2 and deforms to protrude upward, forming a protruding portion 41 having an arcuate cross section. Then, the protruding portion 41 presses the support sheet 6. That is, the support sheet 6 plays a role of absorbing the protruding portion 41 when pressed between the protective sheet 4 and the heating plate 8. Furthermore, the support sheet 6 also serves to prevent the IC chip 2 from being crushed. In this way, after pressing at the time, pressure, and temperature described above, the heating plate 8 is separated, and the IC tag as shown in FIGS. 1 and 2 is completed.

It should be noted that, when pressing the protective sheet 4 as described above, it is preferable to use, for example, a vacuum press. This can prevent air from entering between the bonding agent 5 and the base sheet 1. In particular, since the IC chip 2 protrudes from the base sheet 1, air tends to enter the surrounding area of the IC chip 2. If air enters in this way, the antenna 3 may be disconnected, and therefore it is preferable to use a vacuum press.

3. Features

As described above, according to the present embodiment, the protective sheet 4 has the protruding portion 41 formed in a protruding shape along the IC chip 2, and in regions other than the protruding portion 41, the lower surface of the protective sheet 4 is lower than the uppermost surface of the IC chip 2 and is close to the base sheet 1. As a result, the vicinity of the peripheral edge of the protruding portion 41 and the vicinity of the peripheral edge of the IC chip 2 are particularly close to each other, and therefore when the IC tag is folded, for example, the IC chip 2 is supported by the lower surface of the protruding portion 41, and therefore it is possible to prevent the IC chip 2 from being separated from the antenna 3.

4. Modified Examples

Although one embodiment of the present invention has been described above, the present invention is not limited to the above-described embodiment, and various modifications are possible without departing from the gist of the invention. A plurality of modified examples shown below can be appropriately combined.

<4-1>

Figure 4:
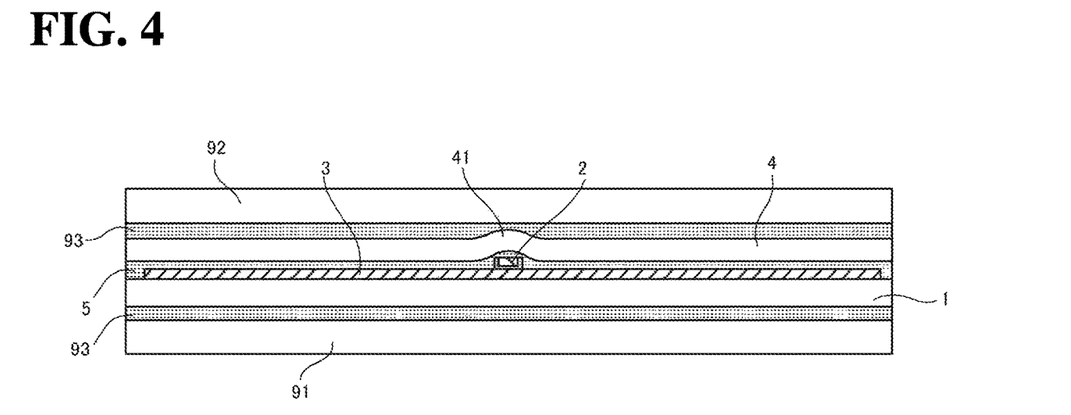
FIG. 4 is a cross-sectional view showing another example of an IC tag according to the present invention.

In the above embodiment, the dipole antenna 3 and the IC chip 2 are sandwiched between the support sheet and the protective sheet 4. However, for example, as shown in FIG. 4, a sheet-like first cover member 91 and a second cover member 92 can be further provided respectively on the lower surface side of the base sheet 1 and the upper surface side of the protective sheet 4, via a bonding agent 93. Each of the cover members 91 and 92 can be made of the same material and with the same thickness as the base sheet 1. Also, there is no particular limitation on the bonding agent 93, and the bonding agent 93 may also be a known double-sided tape. In particular, it is preferable that the bonding agent 93 between the second cover member 92 and the protective sheet 4 absorbs the protruding portion 41 and prevents the second cover member 92 from being deformed by the protruding portion.

<4-2>

The shape of the dipole antenna 3 described above is an example, and various shapes are possible. Also, the position of the IC chip 2 on the antenna 3 is not particularly limited. Furthermore, various antennas can be used as the antenna 3, and instead the antenna 3 using the dipole antenna as described above, an antenna 3 using a patch antenna may also be used. That is, the shape and the like of the antenna 3 are not particularly limited, and various forms are possible.

<4-3>

The shape of the IC tag, that is, the shape of the base sheet 1 and the protective sheet 4, is not particularly limited, and instead of an elongated shape as described above, various shapes can be used according to the application, such as a rectangular shape, a circular shape, or a polygonal shape. Also, the base sheet 1 and the protective sheet 4 do not necessarily need to have the same shape, and it is sufficient that the IC chip 2 and the antenna 3 are arranged at least between the two sheets 1 and 4.

EXAMPLES

Examples of the present invention will be described below. However, the present invention is not limited to these examples.

1. Preparation of Example and Comparative Example

IC tags according to an example and a comparative example were prepared as follows. In this example and comparative example, the base sheet, protective sheet, IC chip, and antenna are the same, as follows.

Base sheet: PET, thickness 100 μm
Conductive bonding agent: ACP
IC chip: thickness 120 μm
Antenna: Printed silver (same shape as FIG. 1), thickness 10 μm
Protective sheet with bonding agent: PET, thickness 100 μm, the bonding agent was a thermosetting epoxy resin with an initial thickness of 50 μm (however, in the comparative examples, an acrylic pressure-sensitive adhesive with an initial thickness of 50 μm was used)

Next, the example was manufactured. At this time, EMMA with a thickness of 150 μm was used as the support sheet, and manufacturing was performed as shown in FIGS. 3A to 3D. Using a vacuum press, the support sheet was pressed with a heating plate at a pressure of 4 MPa, and the heating plate was heated from 40° C. to 160° C. over 20 minutes. Next, pressing was performed at 160° C. for 35 minutes and then cooling was performed to 40° C. over 15 minutes. Thus, the IC tag according to the example was completed. In this example, a protruding portion protruding in a hemispherical shape was formed on the protective sheet at a position corresponding to the IC chip.

On the other hand, a comparative example was manufactured as follows. That is, the base sheet and the protective sheet were bonded to each other by being pressed by a urethane roller, whereby the IC tag according to the comparative example was manufactured.

2. Evaluation Test

Figure 5A:
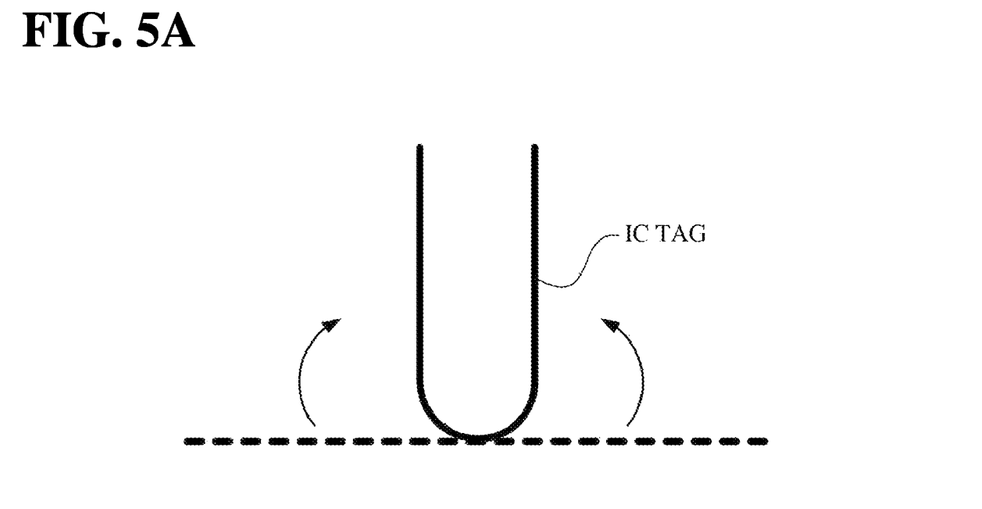
FIG. 5A is a cross-sectional view for illustrating a bending test.
Figure 5B:
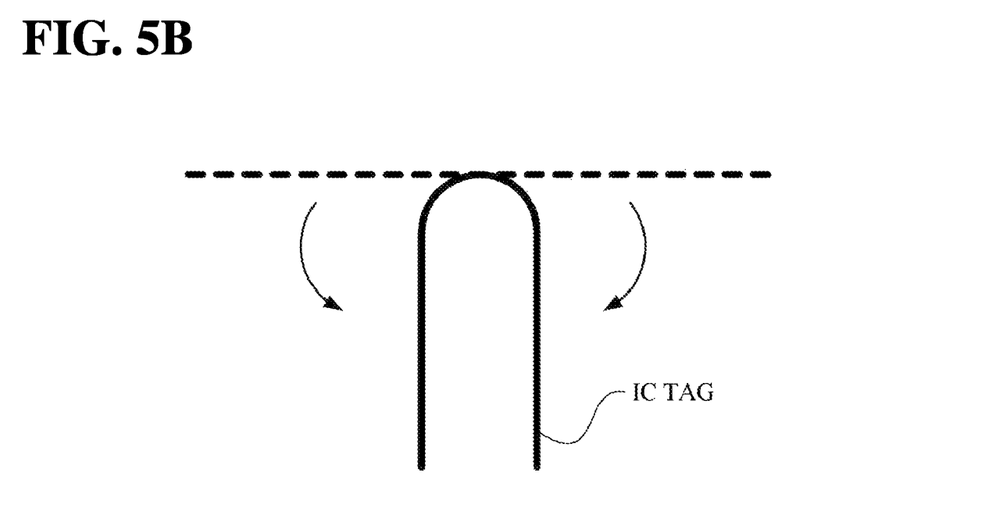
FIG. 5B is a cross-sectional view for illustrating a bending test.

Next, a bending test was performed on the example and the comparative example. That is, as shown in FIG. 5A, the IC tag was folded approximately in half with the IC chip at the center so that both sides face upward, and then, as shown in FIG. 5B, the IC tag was folded approximately in half with the IC chip at the center so that both sides face downward. After performing this for 20 cycles, it was checked whether or not the IC chip separated. As a result, the IC chip did not separate from the antenna in the example, but the IC chip separated from the antenna in the comparative example.

LIST OF REFERENCE NUMERALS

1 Base sheet
2 IC chip
3 Antenna
4 Protective sheet
5 Bonding agent

The invention claimed is:

1. An IC tag comprising:
a base sheet having a first surface and a second surface;
an IC chip arranged on the first surface of the base sheet;
an antenna that is arranged on the first surface of the base sheet and is configured to electrically transmit and receive information stored in the IC chip; and
a protective sheet that is fixed to the first surface of the base sheet via a bonding agent, so as to cover the IC chip and the antenna,
wherein the protective sheet has a protruding portion that protrudes upwardly from a top surface of the protective sheet in a thickness direction along the IC chip.

2. The IC tag according to claim 1, wherein the IC chip is closest to the protective sheet at an edge portion of a surface of the IC chip on the protective sheet side.

3. The IC tag according to claim 1, wherein the bonding agent is made of a thermosetting resin.

4. The IC tag according to claim 1, wherein the protective sheet is made of a resin material with a thickness of 25 to 250 μm.

5. A manufacturing method for an IC tag, the manufacturing method comprising:
fixing an IC chip and an antenna configured to electrically transmit and receive information stored in the IC chip to a first surface of a base sheet having the first surface and a second surface;
arranging a protective sheet on the first surface of the base sheet via a bonding agent, so as to cover the IC chip and the antenna;
arranging an elastically-deformable support sheet on the protective sheet; and
forming a protruding portion that protrudes upwardly from a top surface of the protective sheet in a thickness direction along the IC chip on the protective sheet by pressing the protective sheet while heating, via the support sheet.

6. The manufacturing method for an IC tag according to claim 5, wherein a vacuum press is used in the pressing of the protective sheet.

7. The IC tag according to claim 1, wherein the bonding agent is arranged to cover the IC chip and the antenna between the base sheet and the protective sheet, and a part of the bonding agent that covers the IC chip protrudes along the IC chip, and
the protruding portion protrudes along the part of the bonding agent.

8. The IC tag according to claim 1, wherein the protruding portion is formed along the IC chip so as to have a substantially arcuate cross section.

9. The IC tag according to claim 1, wherein the protruding portion is formed in a substantially circular shape in plan view.

* * * * *